(12) United States Patent
Tsukamoto et al.

(10) Patent No.: US 10,066,562 B2
(45) Date of Patent: Sep. 4, 2018

(54) CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Shota Tsukamoto, Mishima (JP); Kotaro Suzuki, Minamiashigara (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 0 days.

(21) Appl. No.: 15/606,957

(22) Filed: May 26, 2017

(65) Prior Publication Data

US 2018/0010538 A1  Jan. 11, 2018

(30) Foreign Application Priority Data

Jul. 5, 2016 (JP) .................. 2016-133436
Feb. 28, 2017 (JP) .................. 2017-035824

(51) Int. Cl.

| F02D 41/06 | (2006.01) |
|---|---|
| F02B 23/10 | (2006.01) |
| F02P 5/153 | (2006.01) |
| F02P 5/152 | (2006.01) |
| F02D 43/04 | (2006.01) |
| F02P 5/15 | (2006.01) |

(Continued)

(52) U.S. Cl.
CPC ............ *F02D 41/068* (2013.01); *F02B 23/10* (2013.01); *F02D 43/04* (2013.01); *F02P 5/1502* (2013.01); *F02P 5/153* (2013.01); *F02P 5/1523* (2013.01); *F02B 23/08* (2013.01); *F02D 41/02* (2013.01); *F02D 41/04* (2013.01); *F02D 41/06* (2013.01); *F02D 45/00* (2013.01); *F02P 5/04* (2013.01); *F02P 5/145* (2013.01); *F02P 5/15* (2013.01); *F02P 5/152* (2013.01); *F02P 13/00* (2013.01)

(58) Field of Classification Search
CPC ........ F02D 41/068; F02D 41/04; F02D 41/06; F02D 41/02; F02D 41/402; F02D 41/345; F02D 43/04; F02D 45/00; F02P 5/1502; F02P 5/1523; F02P 5/153; F02P 5/152; F02P 5/15; F02P 5/145; F02P 5/04; F02P 5/1506; F02P 13/00; F02B 23/08; F02B 23/105
USPC ....... 123/298, 299, 300, 305, 672, 685, 491, 123/406.53; 701/105, 113
See application file for complete search history.

(56) References Cited

U.S. PATENT DOCUMENTS

| 7,658,178 B2 | 2/2010 | DeGroot et al. |
|---|---|---|
| 2005/0161021 A1 | 7/2005 | Ishii et al. |

(Continued)

FOREIGN PATENT DOCUMENTS

| DE | 103 05 941 A1 | 8/2004 |
|---|---|---|
| DE | 10 2004 017 988 A1 | 11/2005 |

(Continued)

*Primary Examiner* — Hai Huynh
(74) *Attorney, Agent, or Firm* — Sughrue Mion, PLLC

(57) ABSTRACT

In a catalyst warming-up control, a first time injection is performed by an injector in an intake stroke. A second time injection is performed with an amount smaller than the first time injection in an expansion stroke after a compression top dead center. In the catalyst warming-up control, an interval from the start of the ignition period of an spark plug to the completion of the second time injection is controlled by the ECU so that the initial flame generated from an air-fuel mixture containing the fuel spray injected by the first time injection is brought into contact with the fuel spray injected by the second time injection.

4 Claims, 14 Drawing Sheets

(51) Int. Cl.

| | |
|---|---|
| *F02D 41/02* | (2006.01) |
| *F02D 41/04* | (2006.01) |
| *F02B 23/08* | (2006.01) |
| *F02P 5/04* | (2006.01) |
| *F02P 5/145* | (2006.01) |
| *F02D 45/00* | (2006.01) |
| *F02P 13/00* | (2006.01) |

(56) References Cited

U.S. PATENT DOCUMENTS

| | | |
|---|---|---|
| 2006/0000440 A1 | 1/2006 | Kohler et al. |
| 2008/0319632 A1 | 12/2008 | Miyashita et al. |
| 2016/0290307 A1 | 10/2016 | Urano et al. |

FOREIGN PATENT DOCUMENTS

| | | |
|---|---|---|
| EP | 1 559 889 A2 | 8/2005 |
| JP | 2007-263065 A | 10/2007 |
| JP | 2008-069713 A | 3/2008 |
| JP | 2008-190511 A | 8/2008 |
| JP | 2011-106377 A | 6/2011 |
| JP | 2015-094339 A | 5/2015 |

S100: COOLANT TEMPERATURE > CRITERION? OR IS COMPLETION FLAG SET?
S102: DECIDE START TIMING OF IGNITION PERIOD AND COMPLETION TIMING OF EXPANSION STROKE INJECTION
S104: IS IGNITING ENVIRONMENT CHANGED?
S106: MODIFY START TIMING OF IGNITION PERIOD AND COMPLETION TIMING OF EXPANSION STROKE INJECTION
S108  EXHAUST GAS TEMPERATURE > T1?
S110  COMPLETION FLAG

CONTROL DEVICE FOR INTERNAL COMBUSTION ENGINE

CROSS-REFERENCE TO RELATED APPLICATION

The present application claims priority under 35 U.S.C. § 119 to Japanese Patent Applications No. 2016-133436, filed on Jul. 5, 2016 and No. 2017-35824, filed on Feb. 28, 2017. The contents of these applications are incorporated herein by reference in their entirety.

TECHNICAL FIELD

The present application relates to a control device for an internal combustion engine and, more particularly, to a control device which is applied to an internal combustion engine provided with a spark plug and an in-cylinder injector.

BACKGROUND

An internal combustion engine disclosed in Patent Literature 1 (JP 2011-106377 A) comprises: an injector which has a plurality of injection holes; and a spark plug, the injector and the spark plug being provided in an upper part of a combustion chamber. In the internal combustion engine, a distance from a center position of a discharge gap of the spark plug to a center position of the injection hole which is closest to the spark plug among the plurality of injection holes is set within a specific range. In the internal combustion engine, a control for applying a high voltage to the spark plug is performed over a period from a time point after a lapse of a predetermined time from the start of a fuel injection to a time point when the fuel injection is completed.

In the above-described control, a fuel injection period of the injector overlaps with a period of applying the high voltage to the spark plug. When the fuel is injected by the injector which is supplied with the fuel in a pressurized condition, a low pressure area is formed by entraining air around the fuel spray injected from each injection hole (entrainment). Therefore, when the above-described control is performed, a discharge spark generated in the discharge gap is attracted to the low pressure area formed by the fuel spray from the injection hole closest to the spark plug. The internal combustion engine can thereby improve ignitability of an air-fuel mixture formed around the spark plug.

Patent Literature 1 further introduces activation of an exhaust gas cleaning catalyst as applications of the above described attraction action. Although not mentioned in Patent Literature 1, the exhaust gas cleaning catalyst is generally activated by changing an ignition period, which is normally set near a compression top dead center (i.e., a period of applying a high voltage to the spark plug), to a period retarded from the compression top dead center.

When the above-described control of Patent Literature 1 is applied for the general activation of the exhaust gas cleaning catalyst, the ignition period set at a retarded side from the compression top dead center overlaps with a fuel injection period to improve the ignitability of the air-fuel mixture formed around the spark plug. However, if an igniting environment is changed due to some factors and therefore is out of a desired range, a combustion state may become unstable in spite of the above-described attraction action. In combustion cycles during the control for activating the exhaust gas cleaning catalyst, when the number of combustion cycles in which such a situation occurs is increased, a combustion fluctuation between cycles becomes large, and drivability is affected.

The present application addresses the above problems, and an object of the present application is to suppress the combustion fluctuation between cycles when the control performed so that the fuel injection period of the injector overlaps with the period of applying the high voltage to the spark plug is applied for the activation of the exhaust gas cleaning catalyst.

SUMMARY

A control device for an internal combustion engine according to the present application is a device for controlling an internal combustion engine comprising: an injector, a spark plug, and an exhaust gas cleaning catalyst. The injector is configured to be provided in an upper part of a combustion chamber and is configured to inject fuel from a plurality of injection holes into a cylinder. The spark plug is configured to ignite an air-fuel mixture in the cylinder using a discharge spark, and is provided on a downstream side of the fuel injected from the plurality of injection holes and above a contour surface of the fuel spray pattern which is closest to the spark plug among the fuel spray patterns injected from the plurality of injection holes. The exhaust gas cleaning catalyst is configured to clean an exhaust gas from the combustion chamber.

In order to activate the exhaust gas cleaning catalyst, the control device is configured to control the spark plug so as to generate the discharge spark in an ignition period retarded from a compression top dead center, and control the injector so as to perform first injection at a timing advanced from the compression top dead center and second injection at a timing retarded from the compression top dead center, the second injection being performed so that an injection period overlaps with at least a part of the ignition period.

When it is determined that a parameter related to combustion fluctuation between cycles exceeds a threshold, the control device for an internal combustion engine according to the present application is further configured to control the spark plug and the injector so that an interval from a start timing of the ignition period to a completion timing of an injection period of the second injection is increased as compared with a case where it is determined that the parameter is lower than the threshold.

An air-fuel mixture containing the fuel spray by the first injection generates initial flame in the ignition period. When the second injection is performed so that an injection period overlaps with at least a part of the ignition period, at least the initial flame is attracted to the low pressure area formed around the fuel spray injected from the injection hole which is closest to the spark plug. When the second injection is performed, the attracted initial flame is brought into contact with the fuel spray injected by the second injection, and the fluctuation for growing the initial flame is to be promoted.

However, if this contact is not sufficient, the combustion for growing the initial flame becomes unstable. When the number of cycles in which the combustion for growing the initial flame becomes unstable is increased, the combustion fluctuation between cycles becomes large.

In this regard, when it is determined that the parameter related to the combustion fluctuation between cycles exceeds the threshold, the interval from the start of the ignition period to the completion of the second injection becomes longer by controlling so that the interval from the start timing of the ignition period to the completion timing of the injection timing of the second injection is increased as compared with the case where it is determined that the parameter is lower than the threshold, and the start of the second injection is waited for until the initial flame is grown to some extent. Accordingly, the situation that the attracted initial flame and discharge spark and the fuel spray injected by the second injection are not sufficiently contacted can be avoided.

When the parameter exceeds the threshold, the control device may change an increasing amount of the interval in accordance with an amount of the deviation between the parameter and the threshold.

When it is determined that the parameter related to the combustion fluctuation between cycles exceeds the threshold, the increasing amount of the interval is changed in accordance with the amount of the deviation between the parameter and the threshold, thereby permitting the reliable and sufficient contact between the attracted initial flame and the fuel spray injected by the second injection.

The second injection may be completed at a timing advanced from the completion timing of the ignition period.

When the second injection is completed at a timing retarded from the completion timing of the ignition period, only the initial flame is attracted to the low pressure area. On the other hand, when the second injection is completed at a timing advanced from the completion timing of the ignition period, both of the initial flame and the discharge spark are attracted to the low pressure area. Both of the initial flame and discharge spark thus attracted are brought into contact with the fuel spray injected by the second injection. Therefore, when the second injection is completed at the timing advanced from completion timing of the ignition period, the combustion for growing the initial flame is further promoted as compared with a case where the second injection is completed at the timing retarded from the completion timing of the ignition period.

The parameter may be a variation of time required until a crankshaft is rotated by a predetermined angle, or a variation of a crank angle period from the start timing of the ignition period until a mass fraction burnt reaches a predetermined ratio.

When the parameter related to the combustion fluctuation between cycles is the variation of time required until the crankshaft is rotated by the predetermined angle, or the variation of the crank angle period from the start timing of the ignition period until the mass fraction burnt reaches the predetermined ratio, the combustion fluctuation between cycles is detected with a higher accuracy.

A control device for an internal combustion engine according to the present application can suppress a combustion fluctuation between cycles when a control performed so that a fuel injection period of an injector overlaps with a period of applying a high voltage to a spark plug is applied for activation of an exhaust gas cleaning catalyst.

DESCRIPTION OF EMBODIMENTS

Hereafter, embodiments of the present application are described based on the drawings. Note that common elements in the respective figures are denoted by the same signs, and the duplicated descriptions are omitted. The present application is not limited by the following embodiments.

[Description of System Configuration]

Figure 1:
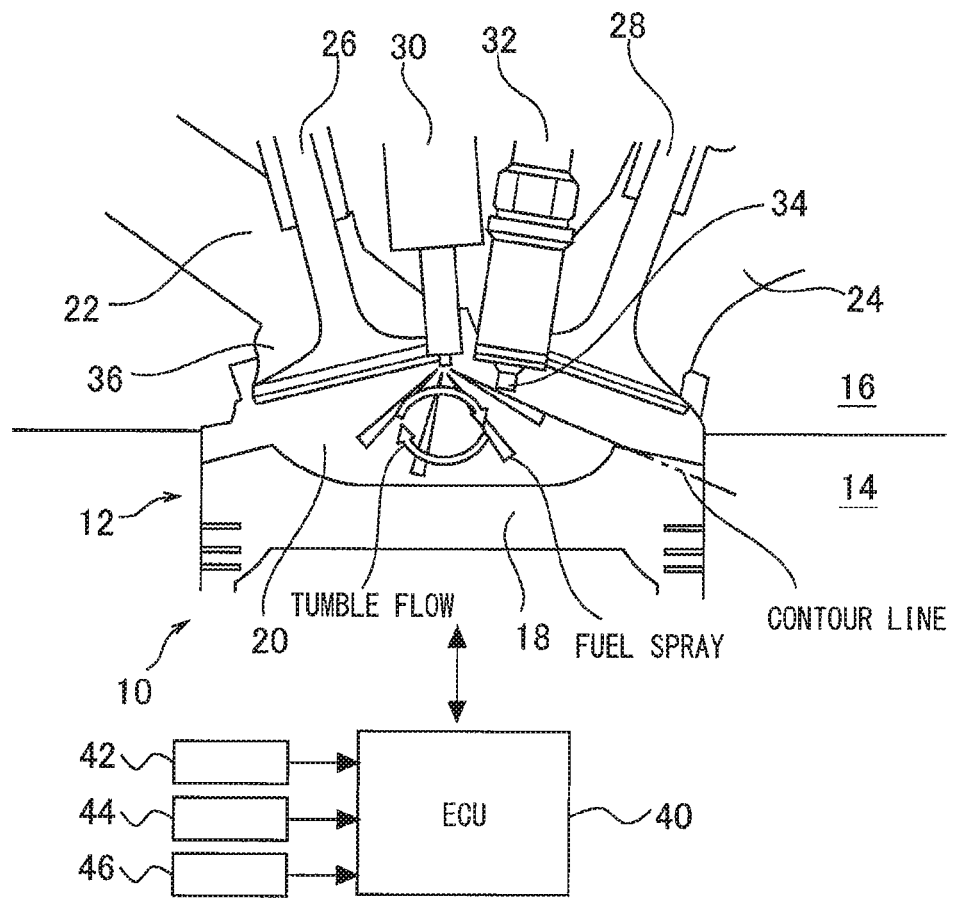
FIG. 1 is a diagram illustrating a system configuration according to an embodiment of the present application.

FIG. 1 is a diagram illustrating a system configuration according to the embodiment of the present application. As illustrated in FIG. 1, a system according to the present embodiment comprises an internal combustion engine 10 mounted in a vehicle. The internal combustion engine 10 is a four-stroke one-cycle engine. The internal combustion engine 10 has a plurality of cylinders, and one cylinder 12 is illustrated in FIG. 1. The internal combustion engine 10 comprises a cylinder block 14 in which the cylinder 12 is formed, and a cylinder head 16 disposed on the cylinder block 14. A piston 18 is disposed in the cylinder 12, the piston 18 reciprocatingly moving in an axial direction of the piston 18 (a vertical direction in the present embodiment). A combustion chamber 20 of the internal combustion engine 10 is defined by at least a wall surface of the cylinder block 14, a bottom surface of the cylinder head 16, and a top surface of the piston 18.

Two intake ports 22 and two exhaust ports 24 which are communicated with the combustion chamber 20 are formed in the cylinder head 16. An intake valve 26 is provided in an opening of the intake port 22 which is communicated with the combustion chamber 20. An exhaust valve 28 is provided in an opening of the exhaust port 24 which is communicated with the combustion chamber 20. An injector 30 is provided in the cylinder head 16 so that a tip of the injector 30 faces the combustion chamber 20 from substantially center of an upper part of the combustion chamber 20. The injector 30 is connected to a fuel supply system comprising a fuel tank, a common rail, a supply pump, and the like. The tip of the injector 30 has a plurality of injection holes arranged radially. When a valve of the injector 30 is opened, fuel is injected from these injection holes in a high pressure state.

In the cylinder head 16, a spark plug 32 is provided so as to be located on the exhaust valve 28 side of the injector 30 and in the upper part of the combustion chamber 20. The spark plug 32 has an electrode part 34 at a tip thereof, the electrode part 34 comprising a center electrode and a ground electrode. The electrode part 34 is disposed so as to protrude to an area above a contour surface of a fuel spray pattern (hereinafter also referred to as an "outer spray pattern") injected from the injector 30 (i.e., an area from the outer spray pattern to the bottom surface of the cylinder head 16). More particularly, the electrode part 34 is disposed so as to protrude to the area above the contour surface of the fuel spray pattern which is closest to the spark plug 32 among the fuel spray patterns injected radially from the injection holes of the injector 30. Note that a contour line drawn in FIG. 1 represents the contour surface of the fuel spray pattern which is closest to the spark plug 32 among the fuel spray patterns injected from the injector 30.

The intake port 22 extends substantially straight from an inlet on an intake passage side toward the combustion chamber 20. A flow passage cross-sectional area of the intake port 22 is reduced at a throat 36 which is a connection part with the combustion chamber 20. Such a shape of the intake port 22 generates a tumble flow in intake air which flows from the intake port 22 into the combustion chamber 20. The tumble flow swirls in the combustion chamber 20. More particularly, the tumble flow proceeds from the intake port 22 side to the exhaust port 24 side in the upper part of the combustion chamber 20, and then proceeds from the upper part of the combustion chamber 20 downward at the exhaust port 24 side. The tumble flow proceeds from the exhaust port 24 side to the intake port 22 side in the lower part of the combustion chamber 20, and then proceeds from the lower part of the combustion chamber 20 upward at the intake port 22 side. A recess is formed on the top surface of the piston 18 forming the lower part of the combustion chamber 20 in order to conserve the tumble flow.

As illustrated in FIG. 1, the system according to the present embodiment comprises an ECU (Electronic Control Unit) 40 as control means. The ECU 40 comprises a RAM (Random Access Memory), a ROM (Read Only Memory), a CPU (Central Processing Unit), and the like. The ECU 40 receives signals from various sensors mounted on the vehicle, and processes the received signals. The various sensors comprise at least a crank angle sensor 42 which detects a rotation angle of a crankshaft connected to the piston 18, an accelerator opening sensor 44 which detects a depression amount of an accelerator pedal operated by a driver, and a temperature sensor 46 which detects a temperature of coolant in the internal combustion engine 10 (hereinafter referred to as "engine coolant temperature"). The ECU 40 processes the signals received from the individual sensors to operate various actuators according to a predetermined control program. The actuator operated by the ECU 40 comprises at least the injector 30 and the spark plug 32 described above.

[Starting Control by ECU 40]

In the present embodiment, the control for promoting the activation of an exhaust gas cleaning catalyst (hereinafter also referred to as "catalyst warming-up control") is performed by the ECU 40 illustrated in FIG. 1 as control immediately after the cold start-up of the internal combustion engine 10. The exhaust gas cleaning catalyst is a catalyst which is provided in an exhaust passage of the internal combustion engine 10. An example of the exhaust gas cleaning catalyst comprises a three-way catalyst which cleans nitrogen oxides (NOx), hydrocarbons (HC), and carbon monoxide (CO) in the exhaust gas when the atmosphere of the catalyst in an activated state is near the stoichiometry.

Figure 2:
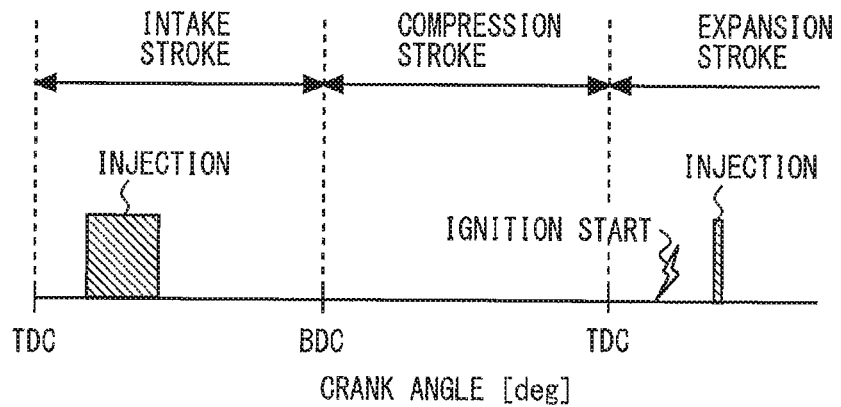
FIG. 2 is a diagram illustrating an outline of a catalyst warming-up control.

The catalyst warming-up control performed by the ECU 40 is described with reference to FIGS. 2 to 7. FIG. 2 illustrates a timing of the injection by the injector 30 and a starting timing of an ignition period of the spark plug 32 (a starting timing of a discharge period of the electrode part 34) during the catalyst warming-up control. As illustrated in FIG. 2, during the catalyst warming-up control, the injector 30 performs first time injection (first injection) in an intake stroke, and then performs second time injection (second injection) with an amount (as an example, about 5 mm$^3$/st) smaller than the first time injection in an expansion stroke after a compression top dead center. Note that, in the following description, the first time injection (first injection) is referred to as "intake stroke injection," and the second time injection (second injection) is referred to as "expansion stroke injection." As illustrated in FIG. 2, during the catalyst warming-up control, the starting timing of the ignition period of the spark plug 32 is set to a timing retarded from the compression top dead center. In FIG. 2, the expansion stroke injection is performed at a timing retarded from the starting timing of the ignition period, but the expansion stroke injection may be started at a timing advanced from the starting timing of the ignition period. In this regard, the description is provided with reference to FIG. 3.

Figure 3:
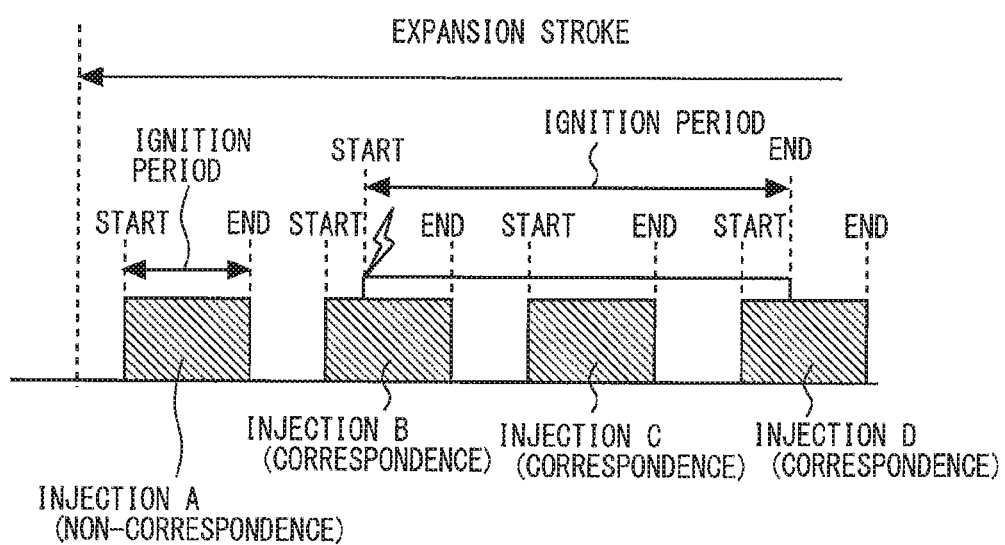
FIG. 3 is a diagram illustrating an expansion stroke injection.

FIG. 3 is a diagram illustrating a timing relationship between an injection period and an ignition period in the expansion stroke injection. FIG. 3 illustrates four injections A, B, C and D which are started at different timings, respectively. The injections A, B, C and D are started at different timings, respectively, but all injection periods thereof have the same length in the expansion stroke injection. The ignition period illustrated in FIG. 3 is equal to the ignition period during the catalyst warming-up control (setting period). In the present embodiment, the injection B performed during which the ignition period is started, the injection C performed during the ignition period, and the injection D performed during which the ignition period is completed, as illustrated in FIG. 3, correspond to the expansion stroke injection. The injection A performed at a timing advanced from the start timing of the ignition period does not correspond to the expansion stroke injection in the present embodiment. This is because it is necessary that at least a part of the injection period overlaps with the ignition period in the expansion stroke injection in order to achieve an attraction action described later.

[Attraction Action by Expansion Stroke Injection]

Figure 4:
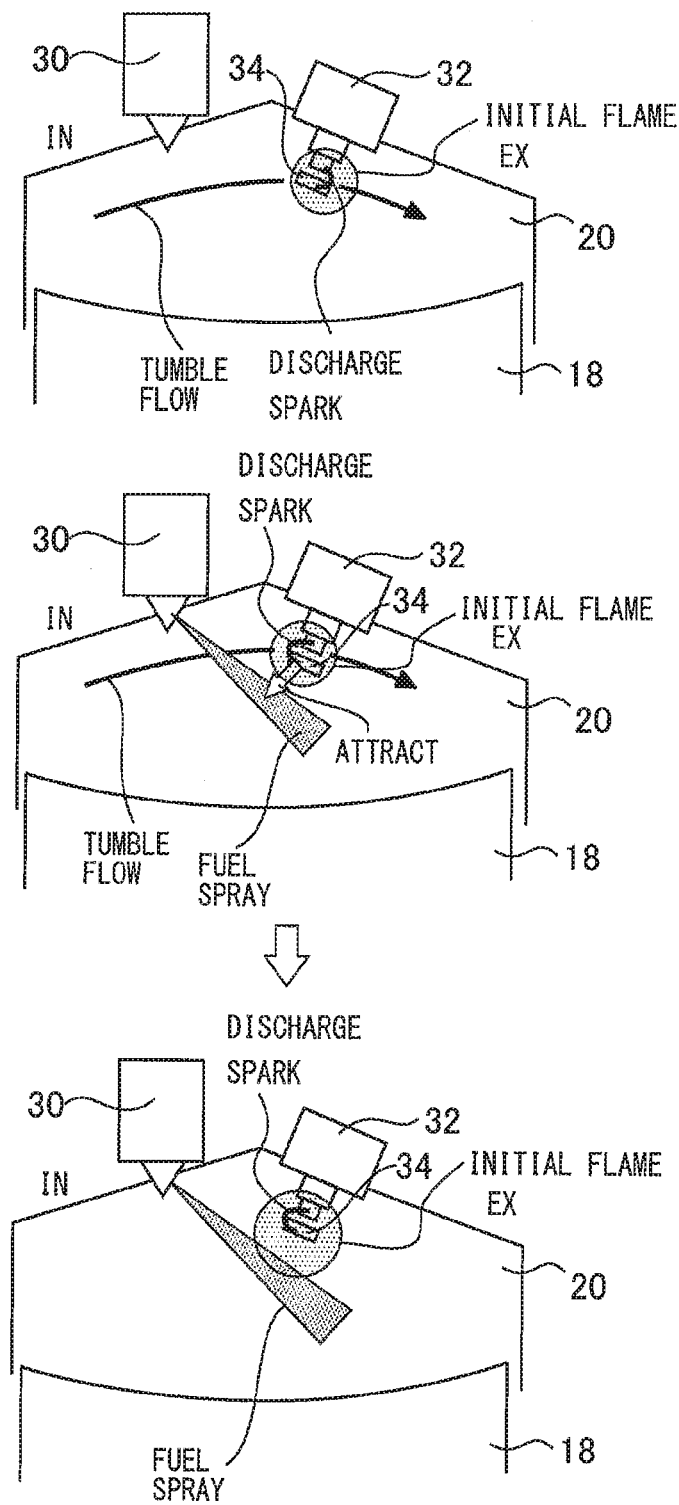
FIG. 4 is a diagram illustrating an attraction action of a discharge spark and initial flame by the expansion stroke injection.

FIG. 4 is a diagram illustrating an attraction action of a discharge spark and initial flame in the expansion stroke injection. An upper part and a middle part (or a lower part) of FIG. 4 illustrate two different states of the discharge spark generated by the electrode part 34 during the ignition period of the spark plug 32 and the initial flame generated by the discharge spark from an air-fuel mixture containing the fuel spray injected by the intake stroke injection, respectively. The upper part of FIG. 4 illustrates a state where the expansion stroke injection is not performed. The middle part (or the lower part) of FIG. 4 illustrates a state where the expansion stroke injection is performed. Note that, for convenience of the description, FIG. 4 illustrates only fuel spray pattern which is closest to the spark plug 32 among fuel spray patterns injected by the expansion stroke injection.

As illustrated in the upper part of FIG. 4, when the expansion stroke injection is not performed, the discharge spark generated by the electrode part 34 and the initial flame extend in a tumble flow direction. On the other hand, as illustrated in the middle part of FIG. 4, when the expansion stroke injection is performed, a low pressure area is formed around the fuel spray (entrainment), and the discharge spark generated by the electrode part 34 and the initial flame are attracted in a direction opposite to the tumble flow direction. Thus, as illustrated in the lower part of FIG. 4, the attracted discharge spark and initial flame are brought into contact with the fuel spray injected by the expansion stroke injection, are entrained in the fuel spray, and grows rapidly. The growth of the initial flame caused by both of the discharge spark and initial flame thus attracted occurs in the injections B and C in illustrated in FIG. 3. The growth of the initial flame in the injection D in FIG. 3 is described later.

The fuel spray injected in the expansion stroke is affected by the tumble flow and the in-cylinder pressure. When the expansion stroke injection is performed at a timing advanced from the starting timing of the ignition period of the spark plug 32 (see the injection A in FIG. 3), the fuel spray injected by this injection changes in its shape before reaching the electrode part 34. As a result, a concentration of the air-fuel mixture around the spark plug is unstable, and a combustion fluctuation between cycles becomes large. However, if the expansion stroke injection is performed so that at least a part of the injection period overlaps with the ignition period (see the injections B, C in FIG. 3), the attraction action illustrated in the middle part of FIG. 4 can be achieved. Even if the fuel spray injected by the expansion stroke injection changes in its shape, the combustion for growing the initial flame (hereinafter also referred to as "initial combustion") can be stabilized, thereby suppressing the combustion fluctuation between cycles.

Furthermore, the combustion following the initial combustion or the grown initial flame can stabilize the combustion further involving the air-fuel mixture containing the fuel spray injected by the intake stroke injection (hereinafter also referred to as "main combustion"). In the injection D illustrated in FIG. 3, the discharge spark disappears when the ignition period is completed, but the initial flame remains. The attraction action caused by the fuel spray injected by the expansion stroke injection allows the initial flame to be brought into contact with the fuel spray. Accordingly, the initial flame is stabilized similarly to the cases of the injections B, C illustrated in FIG. 3, thereby suppressing the combustion fluctuation between cycles.

[Interval Control]

Figure 5:
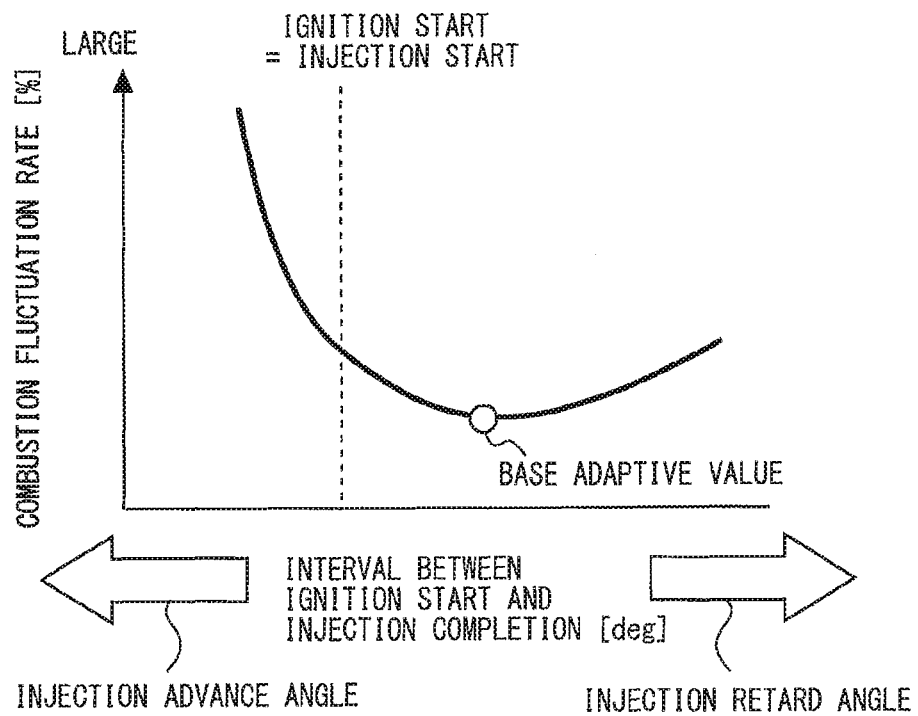
FIG. 5 is a graph showing a relationship between an interval from a start of an ignition period to a completion of an expansion stroke injection (interval between the ignition start and the injection completion) and a combustion fluctuation rate.

In the catalyst warming-up control, the ECU 40 controls an interval from the start of the ignition period of the spark plug 32 to the completion of the expansion stroke injection. FIG. 5 is a graph showing a relationship between the interval from the start of the ignition period to the completion of the expansion stroke injection (interval between the ignition start and the injection completion) and a combustion fluctuation rate. The combustion fluctuation rate in FIG. 5 is obtained by changing the start timing of the expansion stroke injection whose injection period (that is, injection amount) is fixed while fixing the start timing and completion timing of the ignition period. As shown in FIG. 5, a line which indicates the combustion fluctuation rate with respect to the "interval between the ignition start and the injection completion" is a downward convex line. In FIG. 5, when the start timing of the ignition period (ignition start) and the start timing of the expansion stroke injection (injection start) are matched, the combustion fluctuation rate indicates the smallest value at the retarded side from the timing of the ignition start which is the same as the timing of the injection start.

Figure 6:
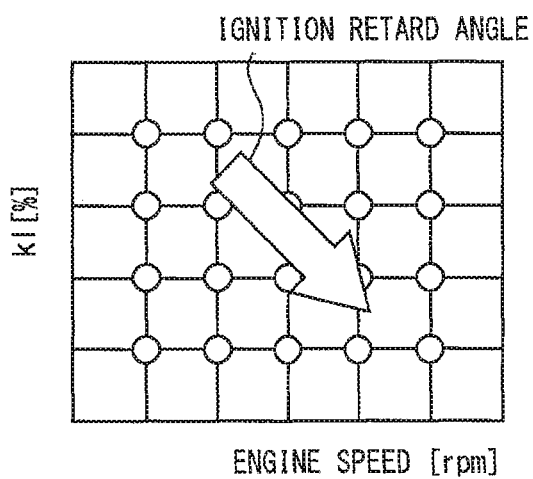
FIG. 6 is a diagram illustrating an example of a base adaptive value map.

The ROM of the ECU 40 stores a map of a value of the "interval between the ignition start and the injection completion" when the combustion fluctuation rate indicates the smallest value as shown in FIG. 5 (hereinafter also referred to as a "base adaptive value") associated with the engine operation state (hereinafter also referred to as a "base adaptive value map"), and the map is read out from the ROM when the catalyst warming-up control is performed. FIG. 6 is a diagram illustrating an example of the base adaptive value map. As illustrated in FIG. 6, the base adaptive value map is created as a two-dimensional map by defining an engine speed and an engine load k1 as both axes. Since the base adaptive value map is created by each of the engine coolant temperature regions divided at intervals of a predetermined temperature, there are a plurality of such two-dimensional maps actually. As indicated by an arrow in FIG. 6, the base adaptive value is set to have a value on the retarded side as the engine speed becomes higher or as the engine load becomes lower. This reason is because the growth of the initial flame is relatively retarded when the engine speed is high, and the growth of the initial flame is relatively fast as the in-cylinder environment is improved when the engine load is high.

Figure 7:
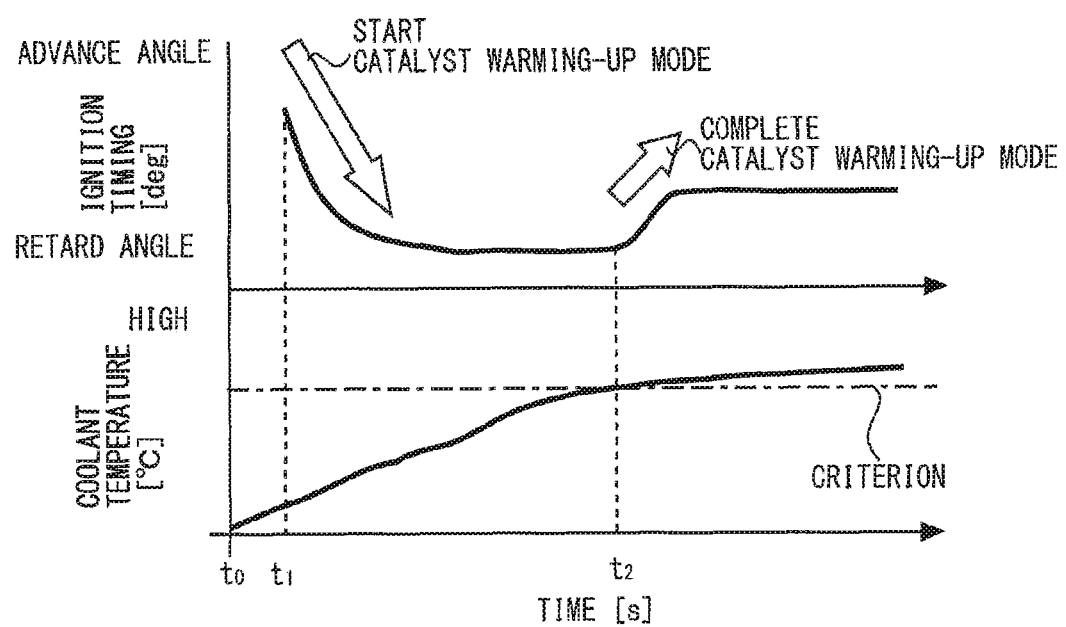
FIG. 7 is a graph showing transition of an ignition timing of a spark plug 32 (more precisely, the start timing of the ignition period) and an engine coolant temperature at a cold start-up of an internal combustion engine.

In the catalyst warming-up control, specifically, the start timing of the ignition period of the spark plug 32 and the completion timing of the expansion stroke injection are decided as follows. First, the start timing of the ignition period of the spark plug 32 is decided in accordance with a basic ignition timing and a retard correction amount. Then, the completion timing of the expansion stroke injection is decided by adding the base adaptive value obtained from the base adaptive value map and the engine operation state to the decided start timing of the ignition period. FIG. 7 is a graph showing transition of the ignition timing of the spark plug 32 (more precisely, the start timing of the ignition period) and the engine coolant temperature at the cold start-up of the internal combustion engine. When the engine is started up at a time $t_0$ indicated in FIG. 7, an operation mode for performing the catalyst warming-up control (hereinafter also referred to as a "catalyst warming-up mode") is started from a time $t_1$ immediately after the time $t_0$, and the ignition timing is gradually set to a value on the retarded side. The catalyst warming-up mode is completed at a time $t_2$ when the engine coolant temperature reaches a criterion (as an example, 50° C.), and then the ignition timing is gradually set to the value on the retarded side.

Note that the basic ignition timing is stored in the ROM of the ECU 40 as a value according to the engine operation conditions (mainly, the intake air amount and the engine speed). The retard correction amount is decided based on the map of the retard correction amount associated with the engine coolant temperature (hereinafter also referred to as a "retard correction amount map"). The retard correction amount map is stored in the ROM of the ECU 40 similarly to the base adaptive value map, and is read out from the ROM when the catalyst warming-up control is performed.

[Problems when Igniting Environment is Out of Desired Range]

In the system illustrated in FIG. 1, if an igniting environment is changed due to some factors and therefore is out of a desired range, a combustion state easily may become unstable in spite of the above-described attraction action caused by the expansion stroke injection. For example, when deposits are accumulated in the injection holes of the injector 30, the injection amount of the intake stroke injection is reduced. Even when the air amount is incorrectly read in an amount smaller than the original amount when the injection amount of the intake stroke injection is calculated, the injection amount of the intake stroke injection is reduced. When the injection amount of the intake stroke injection is reduced, the fuel concentration around the spark plug 32 becomes lower and the growth speed of the initial flame (referred to as a growth speed of the initial flame before contacting with the fuel spray injected by the expansion stroke injection, the same shall apply hereinafter) becomes slower. In a case of poor learning regarding valve timings of the intake valve 26 and the exhaust valve 28, a ratio of exhaust gas remaining in the combustion chamber 20 is increased, and the growth speed of the initial flame becomes slower. When the growth speed of the initial flame becomes slower, the initial flame may not be brought into contact with the fuel spray injected by the expansion stroke injection, and the combustion fluctuation between cycles becomes large.

Figure 8:
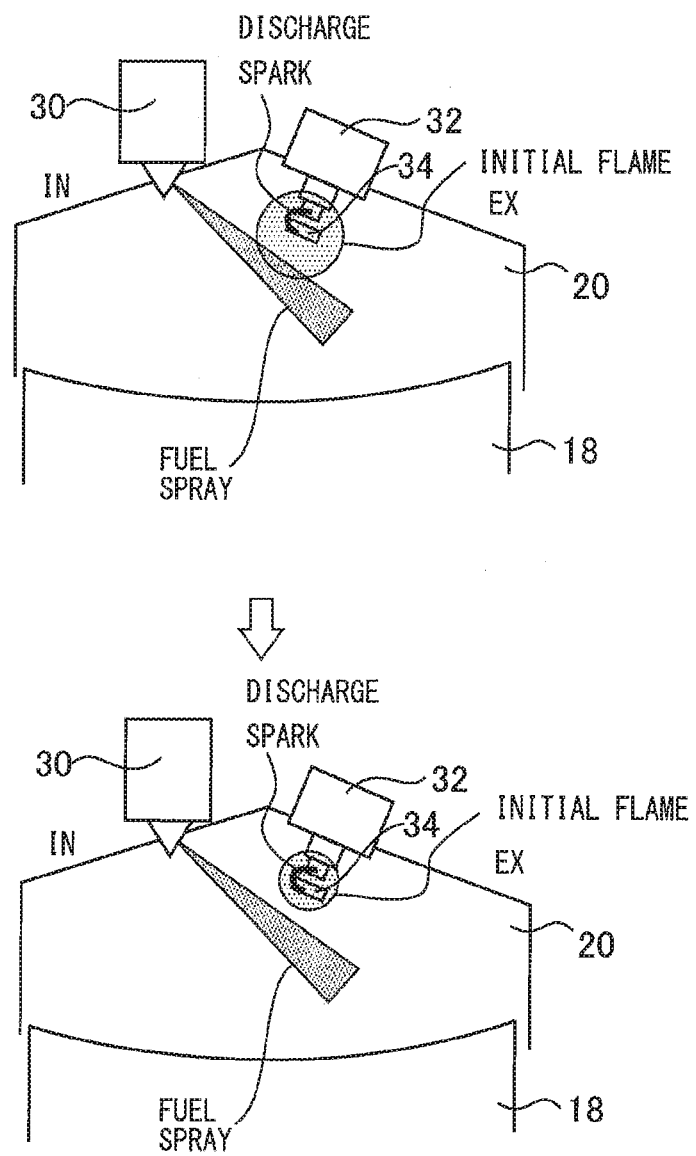
FIG. 8 is a diagram illustrating an in-cylinder state when a growth speed of an initial flame is slow.

FIG. 8 is a diagram illustrating the in-cylinder state when the growth speed of the initial flame is slow. An upper part of FIG. 8 illustrates the in-cylinder state when the igniting environment is within the desired range, the in-cylinder state being the same as the in-cylinder state illustrated in the lower part of FIG. 4. In this case, the discharge spark and initial flame generated by the electrode part 34 are attracted to and brought into contact with the fuel spray injected by the expansion stroke injection, and the initial flame is rapidly grown as described above. That is, there is no particular problem in the growth speed of the initial flame in this case. On the other hand, the lower part of FIG. 8 illustrates the in-cylinder state when the growth speed of the initial flame is slow. In this case, the discharge spark generated by the electrode part 34 is attracted to the fuel spray injected by the expansion stroke injection, but the intended attraction of the initial flame whose growth speed is slow may not be achieved. Therefore, the initial flame may not be brought into contact with the fuel spray injected by the expansion stroke injection. The initial combustion becomes unstable, and the main combustion following the initial combustion also becomes unstable.

For example, when a projection amount of the electrode part 34 to the combustion chamber 20 is reduced due to replacement of the spark plug 32, and when the spray angle is changed due to accumulation of deposits in the injection holes of the injector 30, the distance between an outer spray pattern and the electrode part 34 is increased. When the distance between the outer spray pattern and the electrode part 34 is increased, the initial flame may not be brought into contact with the fuel spray injected by the expansion stroke injection, and the combustion fluctuation between cycles may become large.

Figure 9:
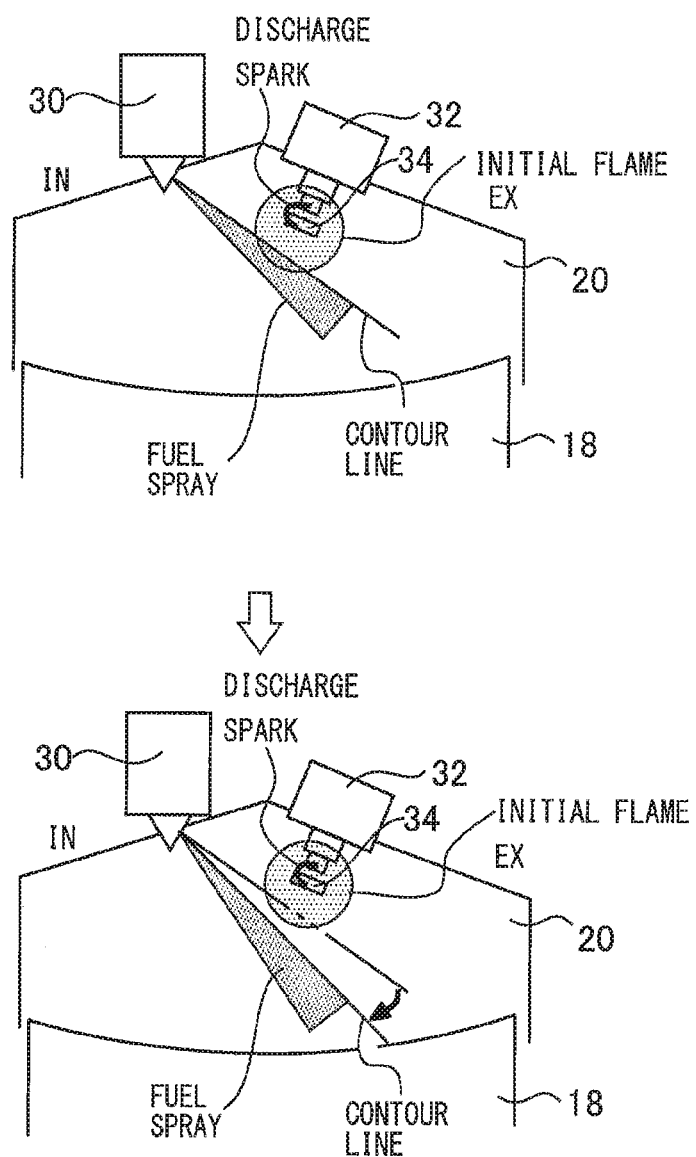
FIG. 9 is a diagram for illustrating the in-cylinder state when a distance between an outer spray pattern and an electrode part 34 is increased.

FIG. 9 is a diagram for illustrating the in-cylinder state when the distance between the outer spray pattern and the electrode part 34 is increased. An upper part of FIG. 9 illustrates the in-cylinder state when the igniting environment is within the desired range, the in-cylinder state being the same as the in-cylinder states illustrated in the lower part of FIG. 4 and the upper part of FIG. 8. On the other hand, the lower part of FIG. 9 illustrates the in-cylinder state when the distance between the outer spray pattern and the electrode part 34 is increased. In this case, since the distance between the low pressure area and the discharge spark and initial flame generated by the electrode part 34 is increased, the low pressure area being formed around the fuel spray injected by the expansion stroke injection, the intended attraction may not be achieved. Therefore, the initial flame may not be brought into contact with the fuel spray injected by the expansion stroke injection. Note that a contour line drawn in FIG. 9 represents the contour surface of the fuel spray pattern which is closest to the spark plug 32 among the fuel spray patterns injected from the injector 30.

If the start timing of the ignition period is advanced, the in-cylinder environment is improved. When the growth speed of the initial flame is reduced (see the lower part of FIG. 8), the initial flame can be brought into contact with the fuel spray injected by the expansion stroke injection by mitigating the reduction of the growth speed. When the distance between the outer spray pattern and the electrode part 34 is increased (see the lower part of FIG. 9), the initial flame can be brought into contact with the fuel spray injected by the expansion stroke injection by promoting the growth speed of the initial flame. However, if the start timing of the ignition period is advanced, the exhaust energy which can be applied to the exhaust gas cleaning catalyst is reduced, and the time is required for the activation of the exhaust gas cleaning catalyst.

These problems are described in detail with reference to FIG. 10. When the igniting environment is within the desired range, the period until the initial flame generated from the fuel spray injected by the intake stroke injection is grown to a size enough to be brought into contact with the fuel spray injected by the expansion stroke injection can be a period within a proper range. As indicated a solid line (in a normal state) in a middle part of FIG. 10, even when the ignition timing (more precisely, the start timing of the ignition period) is set to a crank angle $CA_1$ on the retarded side, the growth speed of the initial flame can be a value ($v_1$) within the proper range. As indicated in a solid line (in the normal state) in an upper part of FIG. 10, the combustion fluctuation rate can be smaller than the criterion. However, when the igniting environment is changed and therefore is out of a desired range, the period until the initial flame generated from the fuel spray injected by the intake stroke injection is grown to a size enough to be brought into contact with the fuel spray injected by the expansion stroke injection is increased. As indicated by a broken line (when the combustion is deteriorated) in the middle part of FIG. 10, when the ignition timing is set to the crank angle $CA_1$, the growth speed of the initial flame is reduced to a value ($v_1$) which is out of the proper range. Therefore, as indicated by a broken line (when the combustion is deteriorated) in the upper part of FIG. 10, the combustion fluctuation rate exceeds the criterion.

Even when the igniting environment is out of the desired range, the tendency of the growth speed of the initial flame can be changed by changing the ignition timing to the advanced side. Specifically, if the ignition timing is reset from the crank angle $CA_1$ to the crank angle $CA_2$, the growth speed of the initial flame can be returned from the value ($v_2$) which is out of the proper range to the value ($v_1$) which is within the proper range. Thus, the initial flame generated from the fuel spray injected by the intake stroke injection can be brought into contact with the fuel spray injected by the expansion stroke injection, thereby allowing the combustion fluctuation rate to be smaller than the criterion. However, as shown in a lower part of FIG. 10, when the ignition timing is reset to the crank angle $CA_2$, the exhaust energy is reduced as compared with the case where the ignition timing is set to the crank angle $CA_1$. Therefore, the time is required for the activation of the exhaust gas cleaning catalyst only by the reduction of the exhaust energy.

Figure 11:
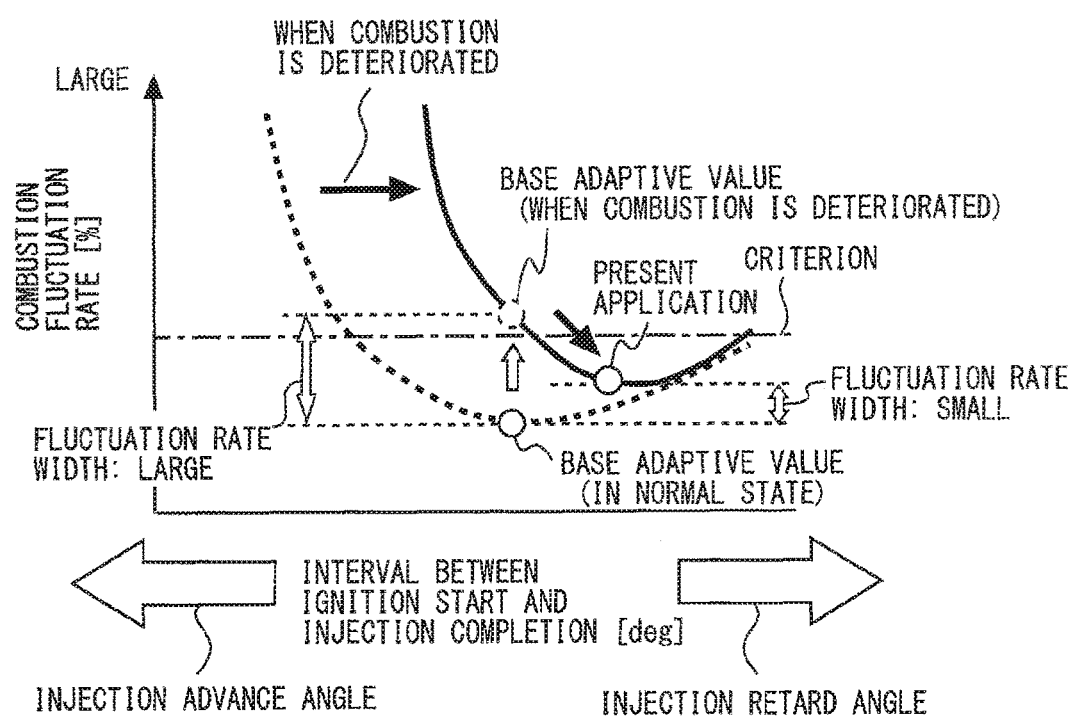
FIG. 11 is a graph showing a modification method of the interval from the start of the ignition period to the completion of the expansion stroke injection.

In the present embodiment, to avoid such situations, the base adaptive value obtained from the base adaptive value map is modified when it is expected that the initial flame may not be brought into contact with the fuel spray injected by the expansion stroke injection because the igniting environment is changed. FIG. 11 is a graph showing a modification method of the interval from the start of the ignition period to the completion of the expansion stroke injection. Similarly to FIG. 5, FIG. 11 illustrates a relationship between the "interval between the ignition start and the injection completion" and the combustion fluctuation. As seen from comparing FIGS. 5 and 11, the relationship is drawn by a solid line in FIG. 5, but is drawn by a broken line in FIG. 11.

Figure 10:
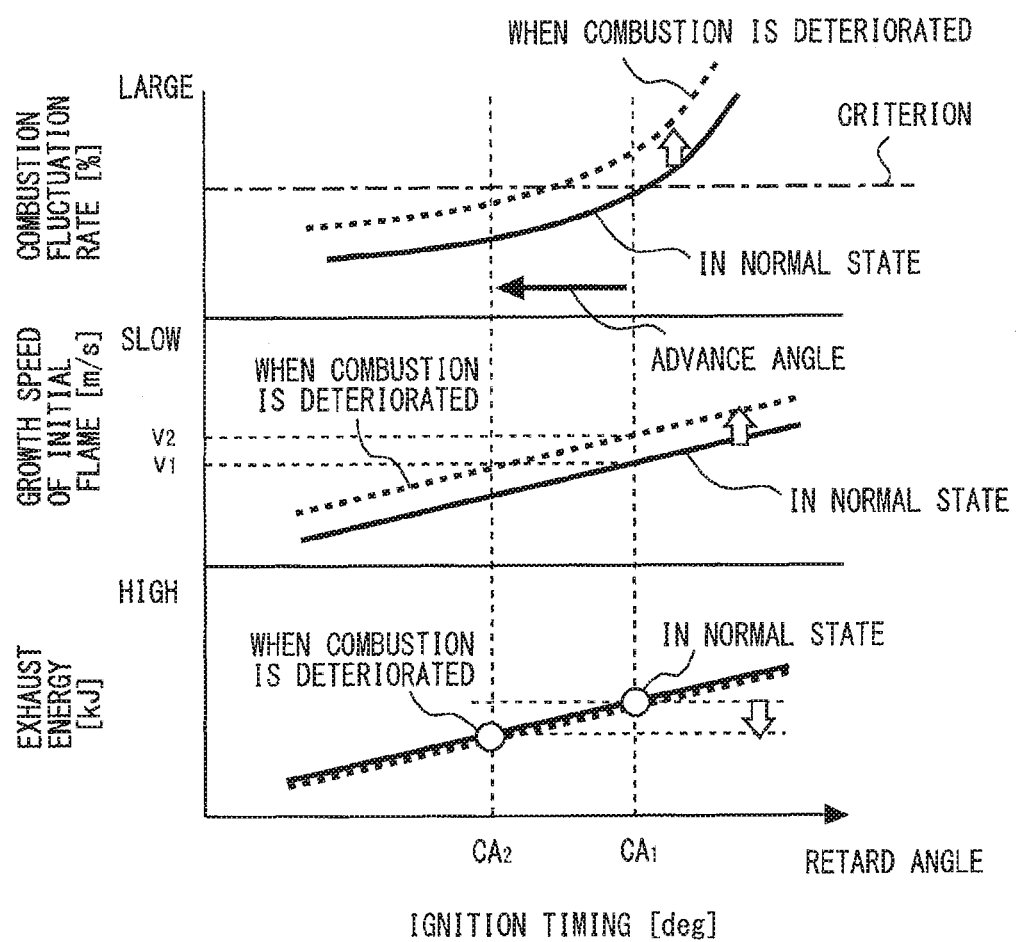
FIG. 10 is a graph showing problems when the ignition timing is advanced.

As explained in FIGS. 8 to 10, when the initial flame may not be brought into contact with the fuel spray injected by the expansion stroke injection, the combustion fluctuation rate becomes large. That is, as shown in FIG. 11, the relationship between the "interval between the ignition start and the injection completion" and the combustion fluctuation is changed from the relationship drawn by a broken line to the relationship drawn by a solid line. However, when the expansion stroke injection is performed with the combustion fluctuation rate set to the base adaptive value, the combustion fluctuation rate exceeds the criterion. In this regard, if the base adaptive value is modified to increase the "interval between the ignition start and the injection completion" according to the relationship indicated by the solid line after the change, the combustion fluctuation rate can be smaller than the criterion.

Note that, as described above, the base adaptive value is a value of the "interval between the ignition start and the injection completion" when the combustion fluctuation rate indicates the smallest value in the case where the igniting environment is within the desired range. Even when the expansion stroke injection is performed based on the modified "interval between the ignition start and the injection completion," the combustion fluctuation rate itself does not become small as compared with the case where the igniting environment is within the desired range. However, if the base adaptive value is modified to increase the "interval between the ignition start and the injection completion," the combustion fluctuation rate can be made to approach the combustion fluctuation rate in the case where the igniting environment is within the desired range by making the combustion fluctuation rate smaller than the criterion.

Figure 12:
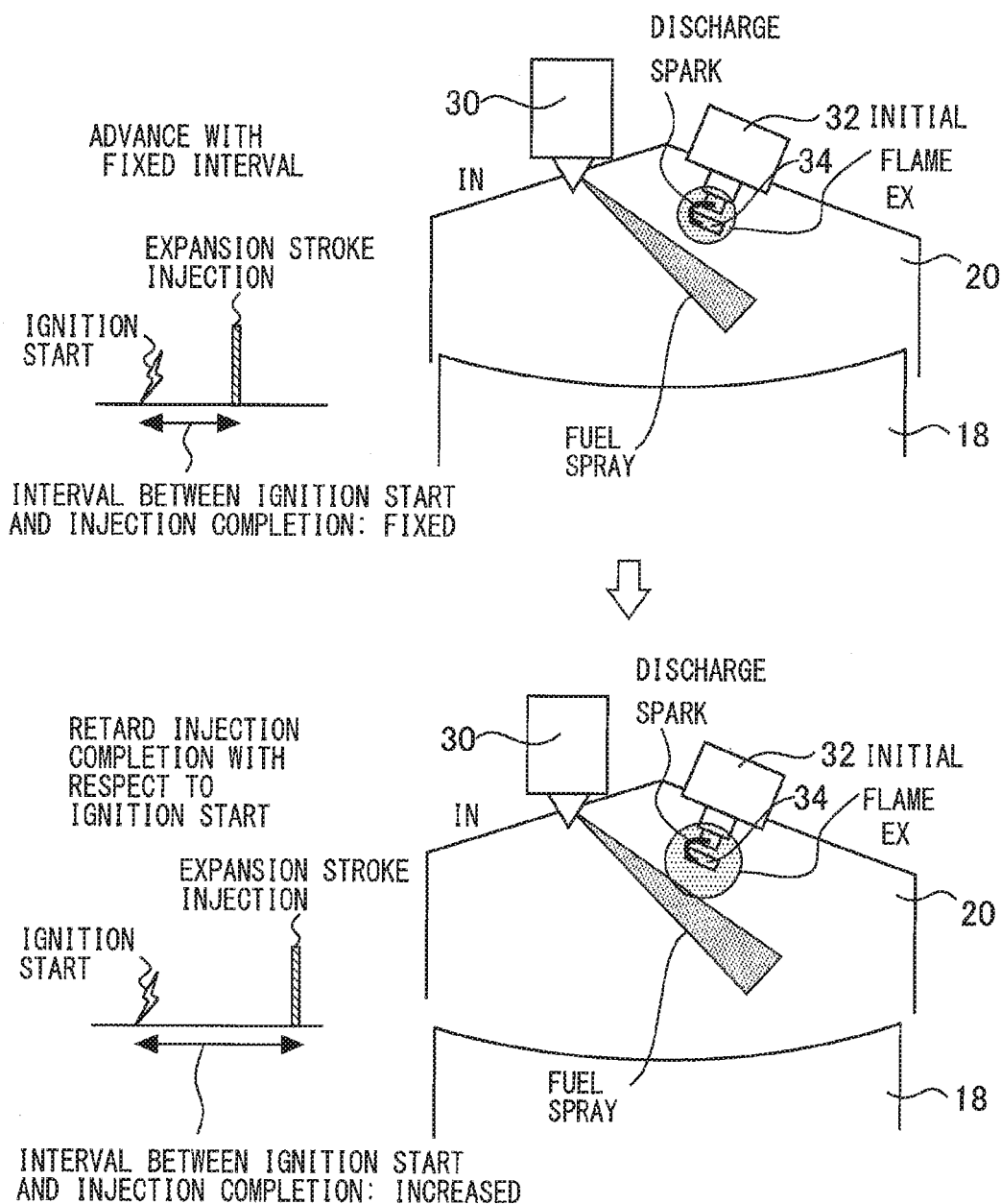
FIG. 12 is a diagram illustrating the in-cylinder state when a base adaptive value is modified to increase the interval from the start of the ignition period to the completion of the expansion stroke injection.

FIG. 12 is a diagram illustrating the in-cylinder state when the base adaptive value is modified to increase the interval from the start of the ignition period to the completion of the expansion stroke injection. Both of an upper part and a lower part of FIG. 12 illustrate the in-cylinder state when the igniting environment is out of the desired range. As a difference between the upper part and the lower part of FIG. 12, the upper part illustrates the case where the ignition timing is advanced with the "interval between the ignition start and the injection completion" fixed to the base adaptive value, and the lower part illustrates the case where the base adaptive value is modified to increase the "interval between the ignition start and the injection completion."

As seen from comparing the upper part and the lower part of FIG. 12, when the "interval between the ignition start and the injection completion" is fixed to the base adaptive value (see the upper part), the initial flame whose growth speed is slow may not be brought into contact with the fuel spray injected by the expansion stroke injection. On the other hand, if the base adaptive value is modified to increase the "interval between the ignition start and the injection completion" (see the lower part), the initial flame can be brought into contact with the fuel spray injected by the expansion stroke injection at a stage when the initial flame is grown to some extent. The state where the initial flame comes into contact with the fuel spray injected by the expansion stroke injection approaches the state where both of the initial flame and the fuel spray are contacted when the igniting environment is within the desired range. Therefore, the initial combustion can be stabilized to suppress the combustion fluctuation, and the main combustion can be also stabilized.

Figure 13:
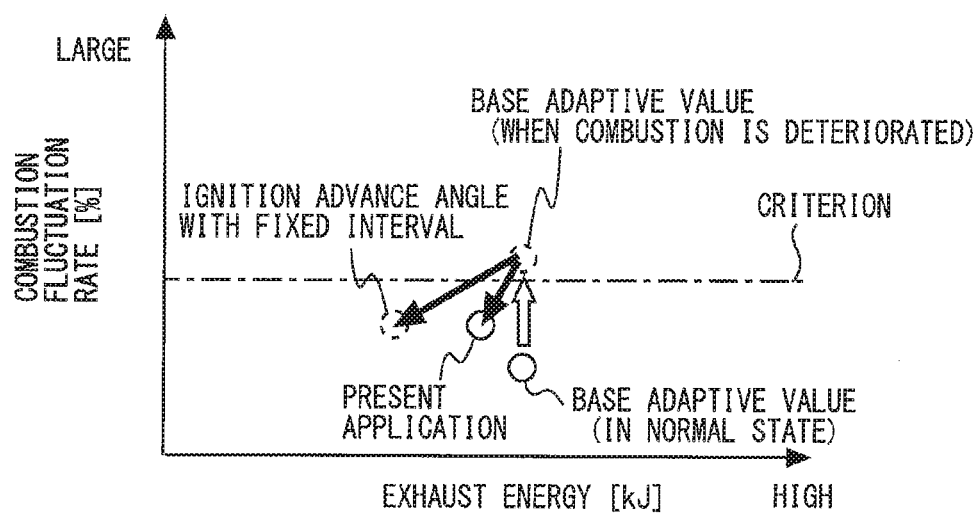
FIG. 13 is a graph explaining the effects when the base adaptive value is modified to increase the interval from the start of the ignition period to the completion of the expansion stroke injection.

If the base adaptive value is modified to increase the "interval between the ignition start and the injection completion," it is not necessary to largely advance the ignition timing, thereby suppressing the reduction of the exhaust energy to be applied to the exhaust gas cleaning catalyst. FIG. 13 is a graph explaining the effects when the base adaptive value is modified to increase the interval from the start of the ignition period to the completion of the expansion stroke injection. The "base adaptive value (in a normal state) in FIG. 13 represents the exhaust energy to be applied to the exhaust gas cleaning catalyst when the catalyst warming-up control is performed in accordance with the base adaptive value and the combustion fluctuation rate in the catalyst warming-up control in the case where the igniting environment is within the desired range. The "base adaptive value (when the combustion is deteriorated)" represents the exhaust energy and the combustion fluctuation rate when the catalyst warming-up control is performed in accordance with the base adaptive value in the case where the igniting environment is out of the desired range. As seen from comparing both base adaptive values, the exhaust energy corresponding to the "base adaptive value (when the combustion is deteriorated)" is equivalent to that corresponding to the "base adaptive value (in the normal state)", but the combustion fluctuation rate corresponding to the "base adaptive value (when the combustion is deteriorated)" is larger than the criterion.

An "ignition advance angle (fixed interval)" in FIG. 13 represents the exhaust energy and the combustion fluctuation rate when the catalyst warming-up control is performed in accordance with the base adaptive value while advancing the ignition timing (more precisely, the start timing of the ignition period) in the case where the igniting environment is out of the desired range. As seen from comparing the "ignition advance angle (fixed interval)" and the "base adaptive value (when the combustion is deteriorated)", the combustion fluctuation rate corresponding to the "ignition advance angle (fixed interval)" is smaller than the criterion, but the exhaust energy corresponding to the "ignition advance angle (fixed interval)" is reduced.

The value of "present application" in FIG. 13 represents the exhaust energy and the combustion fluctuation rate when the catalyst warming-up control is performed in accordance with the modified base adaptive value in the case where the igniting environment is out of the desired range. As seen from comparing the value of "present application" and the other values, the combustion fluctuation rate corresponding to the value of "present application" can be smaller than the criterion. The exhaust energy corresponding to the value of "present application" can be obtained which is lower than that corresponding to the "base adaptive value (in the normal state)", but is higher than that corresponding to the value of "ignition advance angle with fixed interval". Therefore, the exhaust energy required for early activation of the exhaust gas cleaning catalyst can be secured while suppressing the combustion fluctuation rate increase even when the igniting environment is out of the desired range.

[Specific Process]

Figure 14:
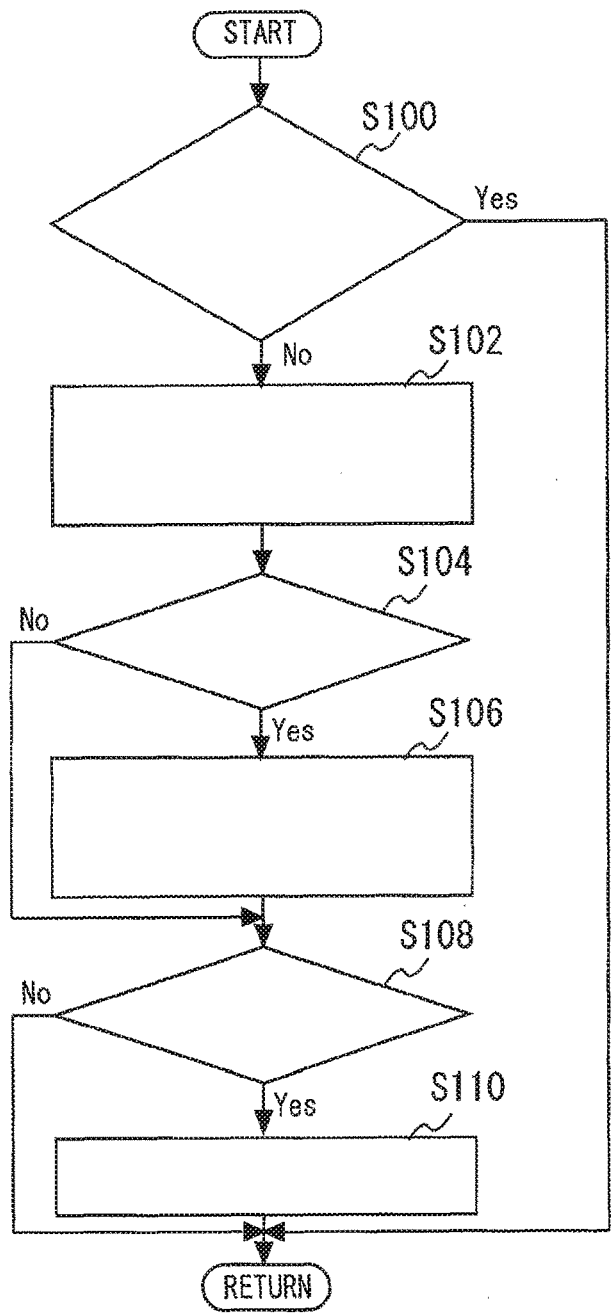
FIG. 14 is a flowchart illustrating an example of a process performed by an ECU 40 in the embodiment of the present application.

FIG. 14 is a flowchart illustrating an example of a process performed by the ECU 40 in the embodiment of the present application. Note that routines illustrated in this figure are repeatedly performed in each cylinder by cycle after the start-up of the internal combustion engine 10.

In the routines illustrated in FIG. 14, first, it is determined whether the engine coolant temperature reaches the criterion, or whether a flag regarding the completion of the catalyst warming-up mode is set (step S100). Specifically, in step S100, it is determined whether the engine coolant temperature reaches the criterion (see FIG. 7) in accordance with a detection value of the temperature sensor 46, or whether the completion flag (see step S110) is set. When it is determined that the engine coolant temperature reaches the criterion, or when it is determined that the completion flag is set (in a case of "Yes"), the process goes out of this routine.

When it is determined in step S100 that the engine coolant temperature does not reach the criterion and the completion flag is not set (in a case of "No"), the start timing of the ignition period of the spark plug 32 and the completion timing of the expansion stroke injection are decided based on the engine operation state (step S102). In step S102, first, the engine coolant temperature is obtained in accordance with the detection value of the temperature sensor 46, and the retard correction amount is obtained based on the retard correction amount map. The start timing of the ignition period of the spark plug 32 is decided in accordance with the retard correction amount and the basic ignition timing. The base adaptive value is obtained in accordance with the engine speed calculated in accordance with the detection value of the crank angle sensor 42, the engine load calculated in accordance with the detection value of the accelerator opening sensor 44, and the engine coolant temperature calculated in accordance with the detection value of the temperature sensor 46, and the base adaptive value map. The completion timing of the expansion stroke injection is decided by adding the obtained base adaptive value to the decided start timing of the ignition period of the spark plug 32.

Figure 15:
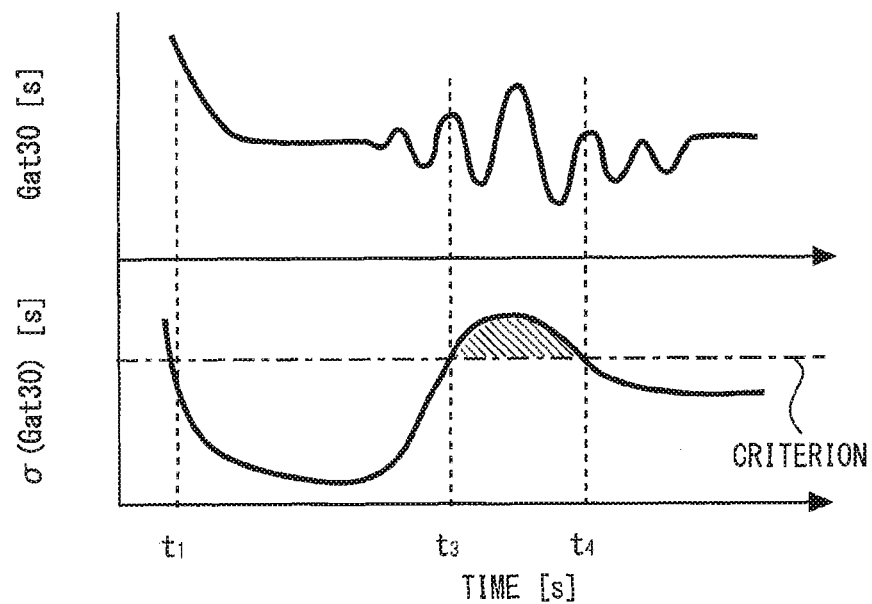
FIG. 15 is a graph showing an example of a Gat 30 when the internal combustion engine is cold-started, and transition of a variation σ of the Gat 30.

Subsequently to step S102, it is determined whether the igniting environment is changed (step S104). In step S104, it is determined whether a variation (standard deviation) σ of Gat 30 exceeds the criterion after the start of the catalyst warming-up control, for example. A rotor of the crank angle sensor 42 is provided with teeth having intervals of 30°. The crank angle sensor 42 is configured to transmit a signal every time the crankshaft rotates by 30°. The Gat 30 is calculated as a time between signals to be transmitted, that is, a time required to rotate the crankshaft by 30°. FIG. 15 is a graph showing an example of the Gat 30 when the internal combustion engine is cold-started, and transition of the variation σ of the Gat 30. In FIG. 15, the abscissa represents an elapsed time after the engine is started, and a time $t_1$ represents the start timing of the catalyst warming-up control. As shown in FIG. 15, the fluctuation of the Gat 30 is small between the time $t_1$ and the time $t_3$. Therefore, it is determined that the variation σ of the Gat 30 is smaller than the criterion. When it is determined that the variation σ of the Gat 30 is smaller than the criterion (in a case of "No"), the process proceeds to step S108.

On the other hand, as shown in FIG. 15, the fluctuation of the Gat 30 becomes large between the time $t_3$ and the time $t_4$. Therefore, it is determined that the variation σ of the Gat 30 is larger than the criterion. When it is determined that the variation σ of the Gat 30 exceeds the criterion (in a case of "Yes"), it can be determined that there are the possibilities that the igniting environment is changed due to some factors and therefore is out of the desired range, and the initial flame may not come into contact with the combustion spray injected by the expansion stroke injection. Therefore, the start timing of the ignition period of the spark plug 32 and the completion timing of the expansion stroke injection are modified (step S106). In step S106, first, the retard correction amount is obtained in accordance with the engine coolant temperature and the retard correction amount map. The start timing of the ignition period of the spark plug 32 is decided in accordance with the retard correction amount and the basic ignition timing. The base adaptive value is obtained in accordance with the engine speed, the engine load and the engine coolant temperature, and the base adaptive value map. The process so far is the same as the process in step S102. In step S106, the obtained base adaptive value is added to the decided start timing of the ignition period of the spark plug 32. Furthermore, the correction value (fixed value) for increasing the interval is further added thereto. The completion timing of the expansion stroke injection is decided.

Subsequently to step S106, in step S108 it is determined whether the exhaust gas temperature exceeds the criterion $T_1$. In this step, it is determined whether the exhaust gas temperature exceeds the criterion $T_1$ in accordance with the detection value of the temperature sensor provided on the downstream side of the exhaust gas cleaning catalyst, for example. If it is determined that the engine coolant temperature reaches the criterion (in a case of "Yes"), the completion flag is set (step S110).

According to the routines illustrated in FIG. 14, it can be determined whether the igniting environment is changed in accordance with the variation σ of the Gat 30 after the catalyst warming-up control is started. When, as a result of the determination, it is determined that there is the possibility that the igniting environment is changed due to some factors and therefore is out of the desired range, the interval from the start of the ignition period to the completion of the expansion stroke injection can be increased. Even when the igniting environment is out of the desired range, the combustion fluctuation between cycles can be suppressed.

Modification of Embodiment

In the embodiment, the tumble flow formed in the combustion chamber 20 swirls from the upper part of the combustion chamber 20 downward at the exhaust port 24 side and from the lower part of the combustion chamber 20 upward at the intake port 22 side. However, the tumble flow may swirl in a direction opposite to this flow direction, that is, the tumble flow may swirl from the upper part of the combustion chamber 20 downward at the intake port 22 side and from the lower part of the combustion chamber 20 upward at the exhaust port 24 side. In this case, it is necessary to change a location of the spark plug 32 from the exhaust valve 28 side to the intake valve 26 side. By thus changing the location of the spark plug 32, the spark plug 32 is located on the downstream side of the injector 30 in the tumble flow direction, thereby achieving the attraction action by the expansion stroke injection.

Furthermore, the tumble flow may not be formed in the combustion chamber 20, because the above-described combustion fluctuation between cycles occurs regardless of the presence of the tumble flow formation.

In the embodiment, the first time injection (first injection) by the injector 30 is performed in the intake stroke, and the second time injection (second injection) is performed in the expansion stroke at the timing retarded from the compression top dead center. However, the first time injection (first injection) may be also performed in the compression stroke. In addition, the first time injection (first injection) may be dividedly performed in a plurality of times, or a divided part of the first time injection may be also performed in the intake stroke and the remainder may be also performed in the compression stroke. Thus, the injection timing and the number of injections in the first time injection (first injection) may be modified in various ways.

Figure 16:
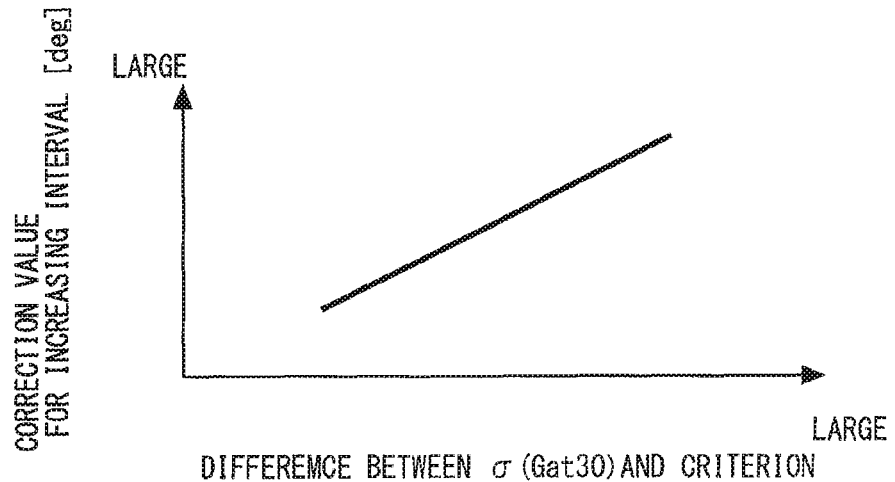
FIG. 16 is a graph showing the relationship between the difference between the variation σ of the Gat 30 and the criterion and the correction value for increasing the interval.

In the above-described embodiment, in the process in step S106 of FIG. 14, the correction value for increasing the interval is defined as a fixed value. However, the correction value for increasing the interval may not be the fixed value. For example, the correction value for increasing the interval may be set to be increased as a difference between the variation σ of the Gat 30 and the criterion shown in FIG. 15 becomes large. When such a setting is performed, a map indicating the relationship between the difference between the variation σ of the Gat 30 and the criterion and the correction value for increasing the interval (see FIG. 16) is stored in the ROM of the ECU 40, and may be read out from the ROM of the ECU 40 in the process of step S106.

In the above-described embodiment, in the process in step S104 of FIG. 14, the determination whether the igniting environment is changed is performed using the variation σ of the Gat 30 after the start of the catalyst warming-up control. Instead of this variation σ, the variation σ of the crank angle period (hereinafter also referred to as an "SA-CA10") from the start timing of the ignition period until the mass fraction burnt (MFB) reaches 10% may be used to perform the determination. The MFB is calculated based on an analysis result of the in-cylinder pressure data obtained using an in-cylinder pressure sensor (not illustrated) provided separately in the combustion chamber 20 and the crank angle sensor 42, and the SA-CA 10 is calculated based on the calculated MFB. Note that a method of calculating the MFB from the analysis result of the in-cylinder pressure data and a method of calculating the SA-CA10 are described in detail in JP 2015-094339 A and JP 2015-098799 A, and the descriptions thereof are omitted.

Figure 17:
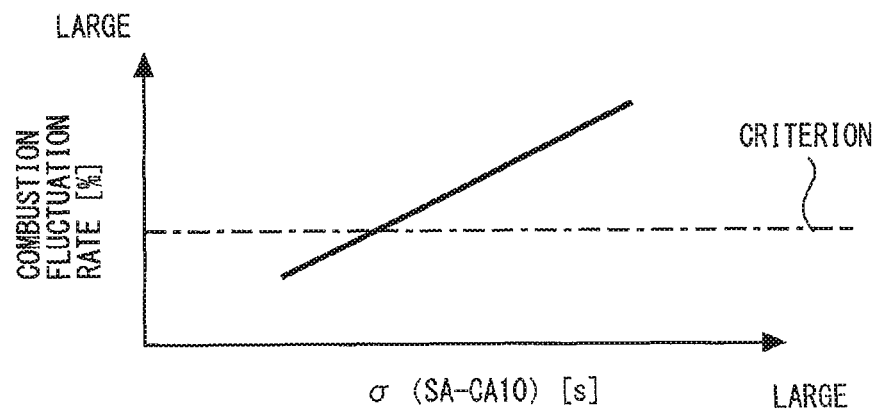
FIG. 17 is a graph showing the relationship between the combustion fluctuation rate and the variation σ of the SA-CA10 when the internal combustion engine is cold-started.
Figure 18:
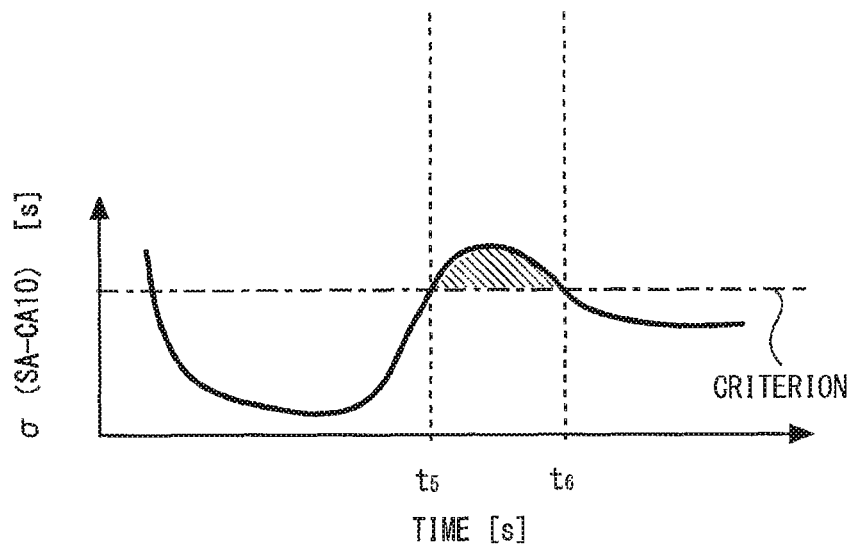
FIG. 18 is a graph showing an example of transition of the variation σ of the SA-CA10.

FIG. 17 is a graph showing the relationship between the combustion fluctuation rate and the variation σ of the SA-CA10. FIG. 18 is a graph showing an example of transition of the variation σ of the SA-CA10 when the internal combustion engine is cold-started. As shown in FIG. 17, the combustion fluctuation rate becomes large as the variation σ of the SA-CA10 becomes large. That is, the variation σ of the SA-CA10 is correlated with the combustion fluctuation rate. For example, it is determined that the variation σ of the SA-CA10 exceeds the criterion between the time t5 and the time t6 as shown in FIG. 18 after the start of the catalyst warming-up control, the process after step S106 of FIG. 14 may be performed by determining that there are the possibilities that the igniting environment is changed due to some factors and therefore is out of the desired range, and the initial flame may not come into contact with the combustion spray injected by the expansion stroke injection variation.

In addition, not only the Gat 30 and SA-CA10, but also the time required to rotate the crankshaft by 60° in the ignition period (Gat60), the crank angle period from the start timing of the ignition period until the MFB reaches 5% (SA-CA5), and the crank angle period from the start timing of the ignition period until the MFB reaches 15% (SA-CA15) may be used. Thus, the parameters which can determine the state where the initial flame comes into contact with the fuel spray injected by the expansion stroke injection (parameters relating to the combustion fluctuation between cycles) can be used as indexes of the determination whether the igniting environment is changed in the above embodiment.

What is claimed is:

1. A control device for an internal combustion engine, the internal combustion engine comprising:
    an injector which is provided in an upper part of a combustion chamber and is configured to inject fuel from a plurality of injection holes into a cylinder;
    a spark plug which is configured to ignite an air-fuel mixture in the cylinder using a discharge spark, the spark plug being provided on a downstream side of the fuel injected from the plurality of injection holes and above a contour surface of a fuel spray pattern which is closest to the spark plug among the fuel spray patterns injected from the plurality of injection holes; and
    an exhaust gas cleaning catalyst which is configured to clean an exhaust gas from the combustion chamber,
    wherein in order to activate the exhaust gas cleaning catalyst, the control device is configured to control the spark plug so as to generate the discharge spark in an ignition period retarded from a compression top dead center, and control the injector so as to perform first injection at a timing advanced from the compression top dead center and second injection at a timing retarded from the compression top dead center, the second injection being performed so that an injection period overlaps with at least a part of the ignition period, and
    when it is determined that a parameter related to combustion fluctuation between cycles exceeds a threshold, the control device is further configured to control the spark plug and the injector so that an interval from a start timing of the ignition period to a completion timing of an injection period of the second injection is increased as compared with a case where it is determined that a parameter is lower than the threshold.

2. The control device for an internal combustion engine according to claim 1, wherein when the parameter exceeds the threshold, the control device is configured to change an increasing amount of the interval is changed in accordance with an amount of deviation between the parameter and the threshold.

3. The control device for an internal combustion engine according to claim 1, wherein the completion timing of the second injection is on an advanced side of the completion timing of the ignition period.

4. The control device for an internal combustion engine according to claim 1, wherein the parameter is a variation of a time required until a crankshaft is rotated by a predetermined angle, or a variation of a crank angle period from the start timing of the ignition period until a mass fraction burnt reaches a predetermined ratio.

* * * * *